(12) United States Patent
Busch et al.

(10) Patent No.: US 7,710,576 B2
(45) Date of Patent: May 4, 2010

(54) METHOD AND APPARATUS FOR MONITORING ANGLE RANDOM WALK OF A FIBER OPTIC GYROSCOPE

(75) Inventors: Darryl Busch, Eden Park, MN (US);
Lee Strandjord, Tonka Bay, MN (US);
Norman Tarleton, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 235 days.

(21) Appl. No.: 12/045,616

(22) Filed: Mar. 10, 2008

(65) Prior Publication Data
US 2009/0225323 A1 Sep. 10, 2009

(51) Int. Cl.
*G01C 19/72* (2006.01)
(52) U.S. Cl. .................................... 356/460
(58) Field of Classification Search .......... 356/459–461
See application file for complete search history.

(56) References Cited

U.S. PATENT DOCUMENTS 5,434,670 A * 7/1995 Albers et al. ............... 356/459
5,682,241 A * 10/1997 Mark et al. ................. 356/462

* cited by examiner

Primary Examiner—Hwa S. A Lee
(74) Attorney, Agent, or Firm—Fogg & Powers LLC

(57) ABSTRACT

A system for determining a level of angle random walk (ARW) associated with a fiber optic gyroscope (FOG) includes first and second photodiodes. The first photodiode is configured to receive a first light signal from a light source associated with the FOG. The second photodiode is configured to receive a second light signal from a fiber optic coil associated with the FOG. First and second analog-to-digital converters (ADCs) are operable to respectively convert the first and second light signals into corresponding respective first and second digital signals. A digital relative-intensity-noise (RIN) subtraction element is configured to receive the first and second digital signals and output a third signal based on the first and second digital signals. An electronic device is configured to determine a first noise level associated with the third signal, and determine the ARW level from the first noise level.

18 Claims, 3 Drawing Sheets

# METHOD AND APPARATUS FOR MONITORING ANGLE RANDOM WALK OF A FIBER OPTIC GYROSCOPE

STATEMENT REGARDING FEDERALLY SPONSORED RESEARCH OR DEVELOPMENT

The present invention was made with support from the United States Government under Grant number N00030-05-C-0063 awarded by the United States Navy. The United States Government has certain rights in the invention.

BACKGROUND OF THE INVENTION

A fiber optic gyroscope (FOG) uses the interference of light to measure angular velocity. A FOG consists of a large coil of optical fiber. To measure rotation, two light beams are fired into the coil in opposite directions. If the sensor is undergoing a rotation then the beam traveling in the direction of rotation will experience a longer path to the other end of the fiber than the beam traveling against the rotation. This is known as the Sagnac effect. When the beams exit the fiber they are combined, and the phase shift introduced due to the Sagnac effect causes the beams to interfere, resulting in a combined beam whose intensity depends on the angular velocity.

Angle random walk (ARW) is one of the key performance parameters of a FOG. ARW is random measurement noise that ultimately limits the accuracy of the FOG and leads to navigation errors. A gyroscope's ARW can be specified by the manufacturer, but it can degrade over time due to faults, aging, or other causes.

SUMMARY OF THE INVENTION

In an embodiment, a system for determining a level of ARW associated with a FOG includes first and second photodiodes. The first photodiode is configured to receive a first light signal from a light source associated with the FOG. The second photodiode is configured to receive a second light signal from a fiber optic coil associated with the FOG. First and second analog-to-digital converters (ADCs) are operable to respectively convert the first and second light signals into corresponding respective first and second digital signals. A digital relative-intensity-noise (RIN) subtraction element is configured to receive the first and second digital signals and output a third signal based on the first and second digital signals, which can serve to reduce noise in an IFOG output. An electronic device is configured to determine a first noise level associated with the third signal, and determine the ARW level from the first noise level.

BRIEF DESCRIPTIONS OF THE DRAWINGS

Preferred and alternative embodiments of the present invention are described in detail below with reference to the following drawings.

DETAILED DESCRIPTION OF THE PREFERRED EMBODIMENT

As will be more fully described hereinafter, a system and method according to an embodiment, and as best illustrated with reference to FIG. 1, uses high-speed photodiode data collected during ½ of a bias modulation of a FOG. This method includes measuring the noise on the data using a noise estimation technique such as, for example, root-mean-square (RMS), avg(abs( )), or peak-to-peak, and uses such noise as a proxy for ARW. If one assumes the noise to be "white noise," then a proportionality relationship exists and is given by the relative bandwidths of the noise monitor versus the output band.

An alternative system and method according to an embodiment, and as best illustrated with reference to FIG. 3, uses lower speed data at the output of a demodulator. The demodulated signal may be low-pass filtered and possibly down-sampled to produce the FOG output. The RMS noise energy removed by the filter may be treated as a proxy for ARW. If one assumes the noise to be "white noise," then a proportionality relationship is calculated and is given by the relative bandwidths of the noise monitor versus the output band.

Figure 1:
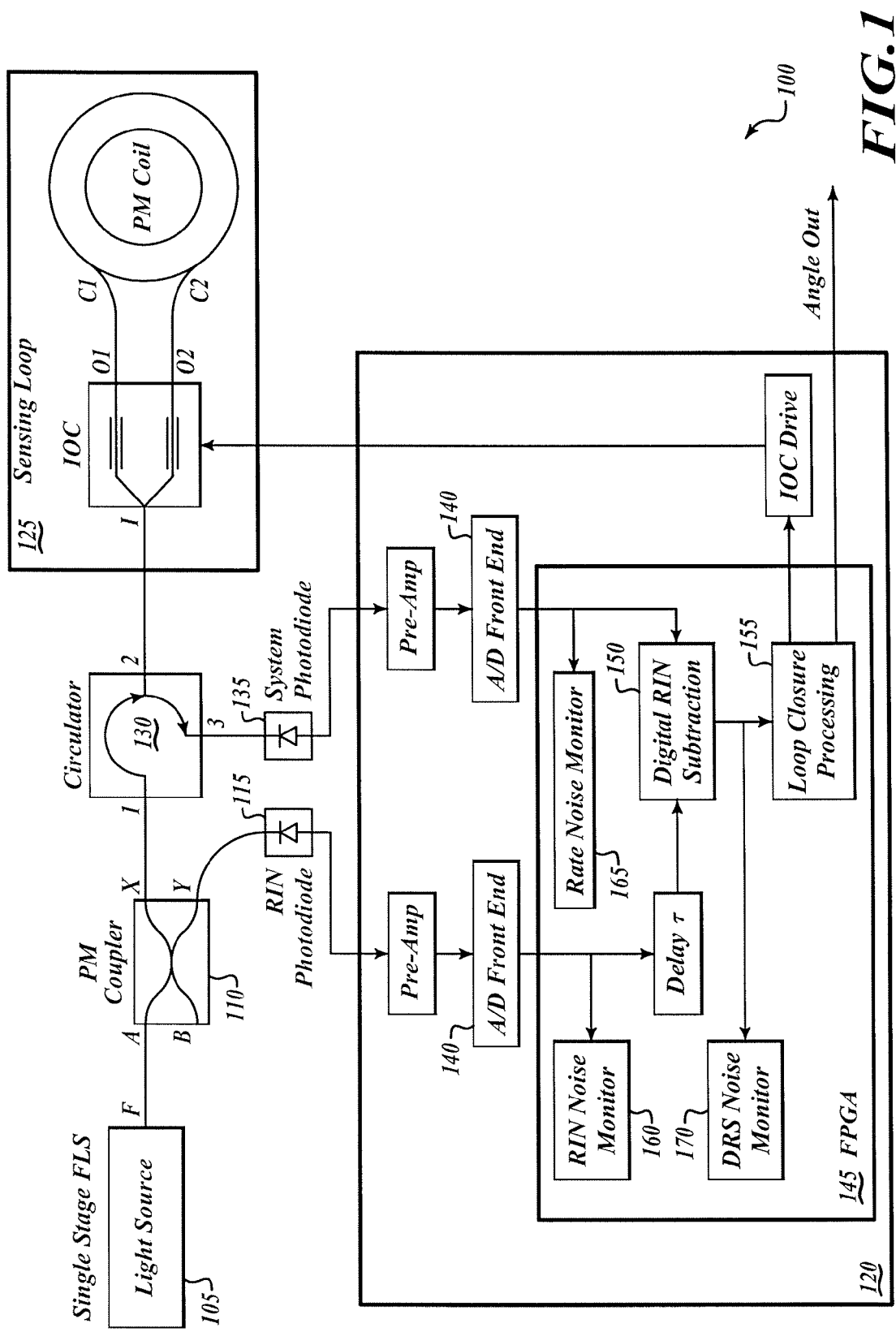
FIG. 1 is a functional block diagram illustrating principles according to an embodiment of the present invention.

FIG. 1 illustrates an FOG system 100 employing principles of an embodiment of the present invention. A light source 105 provides an optical signal or beam to a coupler 110, which may function to redirect a portion of the beam to a relative-intensity-noise (RIN) photodiode 115 of a detector 120. The remainder of the beam may be supplied to a sensing-loop assembly 125 via a circulator element 130 that is, in turn, coupled to a system photodiode 135 of the detector 120.

The detector 120 further includes at least one analog-to-digital converter (ADC) 140 configured to receive optical signals from the RIN photodiode 115 and system photodiode 135. The output of the ADC 140 is to a processing device, which, in the illustrated embodiment, includes a field-programmable gate array (FPGA) 145. In an embodiment, the FPGA 145 includes a digital RIN subtraction element 150 and a loop-closure processing element 155.

An embodiment of the invention utilizes the high sample-rate data produced by the RIN and System photodiode ADCs 140, as well as the Digital RIN Subtraction (DRS) signal derived from the difference of the two. Accordingly, in the embodiment illustrated in FIG. 1, data can be sampled from a RIN Noise monitoring location 160, a Rate Noise monitoring location 165, and/or a DRS Noise monitoring location 170 to determine an ARW level present in the system 100. Such determination may be made by a processor (not shown) included in or external to the system 100, or by processing elements (not shown) of the FPGA 145. The DRS Noise monitoring location 170 is an optionally advantageous location, as it is closest to the final rotation calculation, and thus may offer the best ARW estimate. However, the Rate Noise monitoring location 165 and RIN Noise monitoring location 160 are also optionally advantageous for isolating a noise problem.

Figure 2:
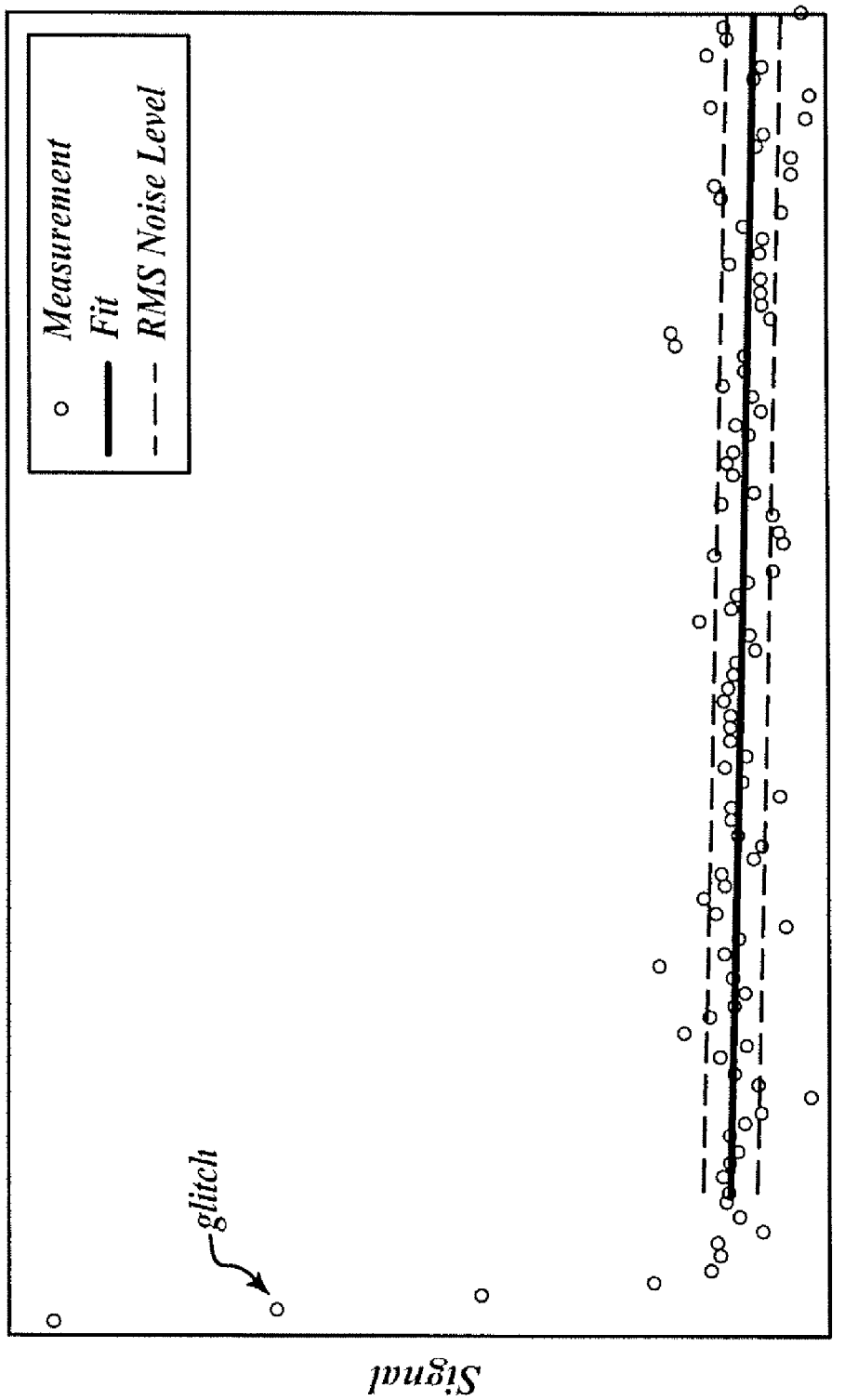
FIG. 2 is a graphical illustration of signal analysis according to an embodiment of the present invention.

The high-speed ARW monitoring approach illustrated in FIG. 1 measures the RMS noise within ½ cycle of the square-wave modulated photodiode signal. In an embodiment, and as illustrated in FIG. 2, the photodiode signal is digitized at 40 megasamples per second (Msps) in the System photodiode signal. Once the glitch passes, the photodiode signal is essentially flat except for stochastic noise. The monitor (e.g., the Rate Noise monitoring location 165) measures the RMS noise on the flat part of the signal after the glitch. FIG. 2 shows a measurement that relies on a linear fit to a line. An alternative approach employs a high-pass filter to isolate the noise from any offset or slow trends instead of a fit.

Figure 3:
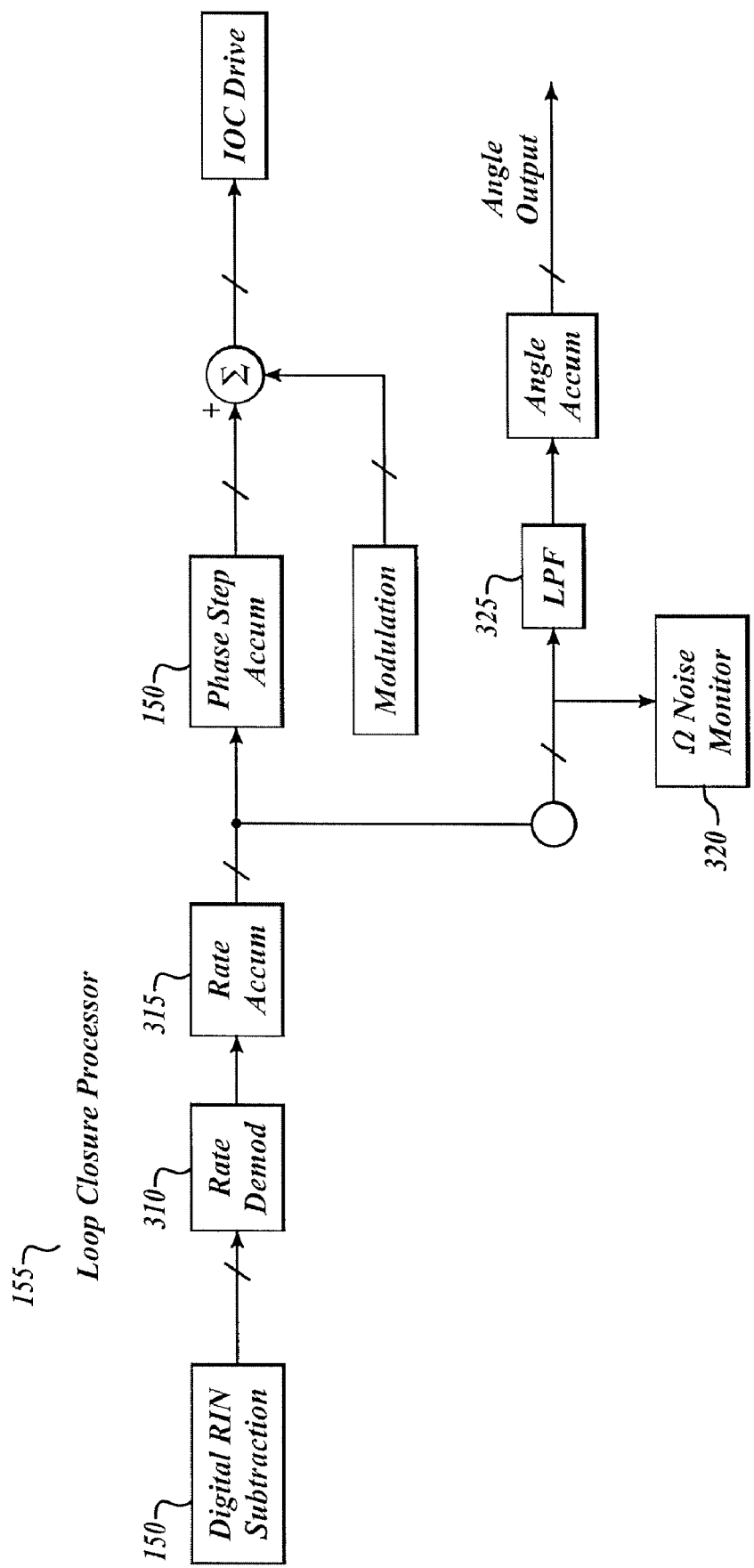
FIG. 3 is a functional block diagram illustrating principles according to an alternative embodiment of the present invention.

FIG. 3 illustrates an alternative approach to ARW determination according to an embodiment. The loop-closure processing element 155 may include a rate demodulator 310 and rate accumulator 315 that, in turn, receive a digital signal from the digital RIN subtraction element 150. Accordingly, in the embodiment illustrated in FIG. 3, data can be sampled from an "Ω residual" monitoring location 320 downstream of the rate demodulator 310 and rate accumulator 315 to determine an ARW level present in the system 100. Such determination may be made by a processor (not shown) included in or external to the system 100, or by processing elements (not shown) of the FPGA 145. The signal sampled by the Ω residual noise monitoring location 320 is a proxy for ARW that can rely on the fact that the gyro internally measures rotation at frequencies as high as the bias modulation frequency, 20 ksps, for example, and then filters and downsamples the measurements to the output sample rate, 1024 sps, for example. The energy that was filtered out by, for example, a low-pass filter 325, can serve as a proxy for ARW based on the following assumptions:

The energy in the "intermediate" band between the output frequency and ½ the modulation frequency also has some manifestation as noise in the gyro output band.

ARW, or more precisely, the dominant contribution to ARW, is assumed to be proportional to the energy measured in the "intermediate" band allowing the low speed monitor to serve as a measurement of ARW.

If the noise is white noise; the proportionality is determined by the relative bandwidths of the gyro output and the noise monitor.

If there are known interference sources in the monitor band that violate the above assumptions, then additional filtering may be required to provide sufficient validity to such assumptions.

An embodiment determines ARW by processing only signals received via the System photodiode 135 and sampling data using the Rate Noise monitoring location 165 and Ω residual noise monitoring location 320. Other embodiments also determine ARW by processing signals received via the RIN photodiode 115 and sampling data using the RIN Noise monitoring location 160 and DRS Noise monitoring location 170.

An embodiment may use one or more of the noise monitors herein as health indicators, without necessarily quantifying the effect on ARW. Excess noise beyond a nominal value indicates an unhealthy gyro.

The embodiments described herein can be enhanced by measuring several sub-bands in the noise monitor's measurement band. The relative energy in each sub-band is used to verify that the noise has the appropriate distribution for a healthy FOG. For example, white noise may be a criteria for a healthy FOG. This is checked by verifying that the noise energy in each sub-band is approximately proportional to the width of the sub-band. Alternatively, one can define different contributions to ARW from the different sub-bands.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system for determining a level of angle random walk (ARW) associated with a fiber optic gyroscope (FOG), the system comprising:
    first and second photodiodes, said first photodiode configured to receive a first light signal from a light source associated with the FOG, said second photodiode configured to receive a second light signal from a fiber optic coil associated with the FOG;
    at least one analog-to-digital converter (ADC) operable to convert the first and second light signals into corresponding respective first and second digital signals;
    a digital relative-intensity-noise (RIN) subtraction element configured to receive said first and second digital signals and output a third signal based on said first and second digital signals; and
    an electronic device in signal communication with said subtraction element, said electronic device configured to determine a first noise level associated with the third signal, and determine the ARW level from said first noise level.

2. The system of claim 1 wherein said electronic device comprises a field-programmable gate array.

3. The system of claim 1 wherein said electronic device is further coupled to said first ADC and is configured to determine a second noise level associated with the first digital signal, and determine the ARW level from said second noise level.

4. The system of claim 1 wherein said electronic device is further coupled to said second ADC and is configured to determine a second noise level associated with the second digital signal, and determine the ARW level from said second noise level.

5. The system of claim 1 wherein said third signal comprises a DRS signal.

6. The system of claim 1 wherein said electronic device is configured to measure the first noise level within a one-half bias-modulation cycle of the FOG.

7. The system of claim 1, wherein determining said ARW level includes analyzing a plurality of sub-bands within an encompassing noise monitoring band of the third signal.

8. A system for determining a level of angle random walk (ARW) associated with a fiber optic gyroscope (FOG), the system comprising:
    first and second photodiodes, said first photodiode configured to receive a first light signal from a light source associated with the FOG, said second photodiode configured to receive a second light signal from a fiber optic coil associated with the FOG;
    at least one analog-to-digital converter (ADC) operable to convert the first and second light signals into corresponding respective first and second digital signals;
    a digital relative-intensity-noise (RIN) subtraction element configured to receive said first and second digital signals and output a third signal based on said first and second digital signals;
    a rate demodulator element configured to receive the third signal and output a fourth signal based on the third signal;
    a rate accumulator element configured to receive the fourth signal and output a fifth signal based on the fourth signal; and
    an electronic device in signal communication with said rate accumulator element, said electronic device configured to determine a first noise level associated with the fifth signal, and determine the ARW level from said first noise level.

9. The system of claim 8 wherein said electronic device comprises a field-programmable gate array.

10. The system of claim 8 wherein said electronic device comprises a low-pass filter.

11. The system of claim 10 wherein:
said electronic device is further configured to downsample a portion of the fifth signal filtered by the low-pass filter; and
the ARW level is determined from said downsampled portion.

12. The system of claim 8, wherein determining said ARW level includes analyzing a plurality of sub-bands within an overall noise monitoring band of the third signal.

13. A method of determining a level of angle random walk (ARW) associated with a fiber optic gyroscope (FOG), comprising the steps of:
receiving a first light signal from a fiber optic coil associated with the FOG;
converting the first light signal into a corresponding first digital signal;
generating a second digital signal based on said first digital signal;
determining first and second noise levels respectively associated with the first and second digital signals; and
determining the ARW level from at least one of said first and second noise levels.

14. The method of claim 13, further comprising:
receiving a second light signal from a light source associated with the FOG;
converting the second light signal into a corresponding third digital signal;
determining a third noise level associated with the third digital signal; and
determining the ARW level from said third noise level.

15. The method of claim 13, further comprising:
receiving a second light signal from a light source associated with the FOG;
converting the second light signal into a corresponding third digital signal;
generating a fourth digital signal based on said third digital signal;
determining a third noise level associated with the fourth digital signal; and
determining the ARW level from said third noise level.

16. The method of claim 15 wherein said fourth digital signal comprises a DRS signal.

17. The method of claim 13 wherein determining a first noise level comprises measuring the first noise level within a one-half bias-modulation cycle of the FOG.

18. The method of claim 13, wherein determining said ARW level includes analyzing a plurality of sub-bands within an overall noise monitoring band of the first digital signal.

* * * * *